United States Patent
Legner et al.

(10) Patent No.: US 6,250,180 B1
(45) Date of Patent: Jun. 26, 2001

(54) HYDROMECHANICAL TRAVELING MECHANISM

(75) Inventors: Jürgen Legner; Egon Mann; Siegfried Stützle, all of Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/530,381

(22) PCT Filed: Dec. 2, 1998

(86) PCT No.: PCT/EP98/07653

§ 371 Date: Apr. 27, 2000

§ 102(e) Date: Apr. 27, 2000

(87) PCT Pub. No.: WO99/30061

PCT Pub. Date: Jun. 17, 1999

(30) Foreign Application Priority Data

Dec. 4, 1997 (DE) .............................. 197 53 729

(51) Int. Cl.[7] .................................. F16H 47/00
(52) U.S. Cl. ........................ 74/733.1; 477/68; 477/52; 74/731.1
(58) Field of Search ............... 477/68, 52; 74/733.1, 74/732.1

(56) References Cited

U.S. PATENT DOCUMENTS

| | | | |
|---|---|---|---|
| 5,009,126 | * 4/1991 | Meisinger et al. | 74/733.1 |
| 5,184,466 | * 2/1993 | Schniederjan et al. | 60/448 |
| 5,207,060 | * 5/1993 | Sheets | 60/483 |
| 5,364,316 | * 11/1994 | Brambilla | 475/80 |
| 5,505,113 | 4/1996 | Wiest | 74/733.1 |
| 5,634,335 | * 6/1997 | Schniederjan et al. | 60/450 |
| 5,684,694 | * 11/1997 | Ishino et al. | 364/424.08 |
| 5,823,072 | 10/1998 | Legner | 74/733.1 |

FOREIGN PATENT DOCUMENTS

| | | |
|---|---|---|
| 26 52 976 | 5/1978 | (DE) . |
| 42 23 846 | 1/1994 | (DE) . |
| 44 31 864 | 3/1996 | (DE) . |
| 195 24 189 C2 | 7/1997 | (DE) . |
| 89/03320 | 4/1989 | (WO) . |

* cited by examiner

Primary Examiner—Sherry Estremsky
Assistant Examiner—Tisha D. Lewis
(74) Attorney, Agent, or Firm—David & Bujold, P.L.L.C.

(57) ABSTRACT

A traveling mechanism having a driving motor (24) which drives a feed pump (25) and a hydrostatic variable displacement pump (2), a zero fluctuating hydrostatic variable displacement motor (1) which forms with the hydrostatic variable displacement pump (2) a hydrostatic circuit and a hydrostatically driven 2-speed gear mechanism (11) which is engaged when the torque to be transmitted is minimal and the hydrostatic variable displacement motor (1) is at zero displacement capacity.

8 Claims, 2 Drawing Sheets

HYDROMECHANICAL TRAVELING MECHANISM

The invention relates to a traveling mechanism.

BACKGROUND OF THE INVENTION

Traveling mechanisms with hydrostatic gear and multi-ratio change gear transmission are used in the modern construction and mobile machinery such as loaders, excavators or crawlers. A driving motor, particularly a diesel engine, drives a hydrostatic variable displacement pump which, together with the variable displacement motor, forms a hydrostatic transmission having a reduction ratio adjusted by a rotational-speed dependent control pressure. The subject is a rotational-speed dependent, automotive adjustment of the hydrostatic mechanism, i.e. pump and motor automatically regulate the reduction ratio, according to the rotational speed, and the load of the primary drive mechanism so that the reduction ratio increases as the load increases and decreases as the rotational speed increases. Together with the hydrostatic transmission, the driving device belongs to a power shiftable transmission in the form of a two-gear planetary transmission. Two auxiliary pumps, driven by the primary drive mechanism, a feed and control pump produce the system and control pressure. An auxiliary pump with the distributer system can also be used instead of the two auxiliary pumps. Electromagnetic valves control the pressurized fluid supply to the powershift elements which can be actuated pneumatically, hydraulically, electromagnetically or by springs.

In traveling mechanism systems for mobile machinery, several draft variants are distinguished. The different mechanism drafts are tailored to the corresponding main requirements. Thus, even though the dog clutch or sliding transmission shiftable when parking can be economically produced, they make gear shifts possible only when parking with unfavorable control comfort at the same time. On the other hand, it is possible by using hydrostatic summarizing transmissions with two or more hydromotors to obtain a relatively better traveling comfort. But the variant is comparatively expensive and has only a small conversion range, the same as an unfavorable degree of efficiency at high driving speeds. Likewise costly and requiring high expenditures, another solution is a combination gear with hydrostatic summarizing and rear-mounted power shift clutches. The shifting operations are carried always out in branches of the transmission that transmit no power. Power shiftable transmissions with continuously variable hydrostatic system combined with synchronized shifting sequences offer great traveling comfort, but are an uneconomical solution from the points of view of cost and efficiency.

A traveling mechanism with a hydrostatic transmission and a multi-ratio gear change transmission for mobile construction and working machinery has been disclosed in DE 44 31 864 A1, but the traveling mechanism is expensive due to the use of a powershift transmission.

The problem on which this invention is based is to produce an economical, simple driving solution which stands out by favorable efficiency ratios, relatively comfortable shifting sequences, even while driving, and the possibility of automatic shifting operations. Besides, it is suited to open and closed hydrostatic, hydraulic circuits and for slow and fast moving machines.

The problem on which the invention is based is solved by a traveling mechanism.

SUMMARY OF THE INVENTION

The use of hydrostatically driven, 2-speed gear mechanism with a synchronization unit instead of a powershift transmission makes possible the construction of a small, compact and economical assembly which, at the same time, can transmit high power. In addition, the synchronization unit can be made with small dimensions because of the slight torque to be transmitted during gear shift. Additionally, the assembly can be used both for closed and open hydraulic circuits.

Advantageous and convenient developments of the invention are given in the subclaims, but the invention is not limited to the combination of features of the claims. Other logical possible combinations result for the expert from the claims and separate features of the claims according to the problem at hand.

BRIEF DESCRIPTION OF THE DRAWINGS

Below are described in principle two embodiments of this invention. In the drawings.

DESCRIPTION OF THE PREFERRED EMBODIMENT

Figure 1:
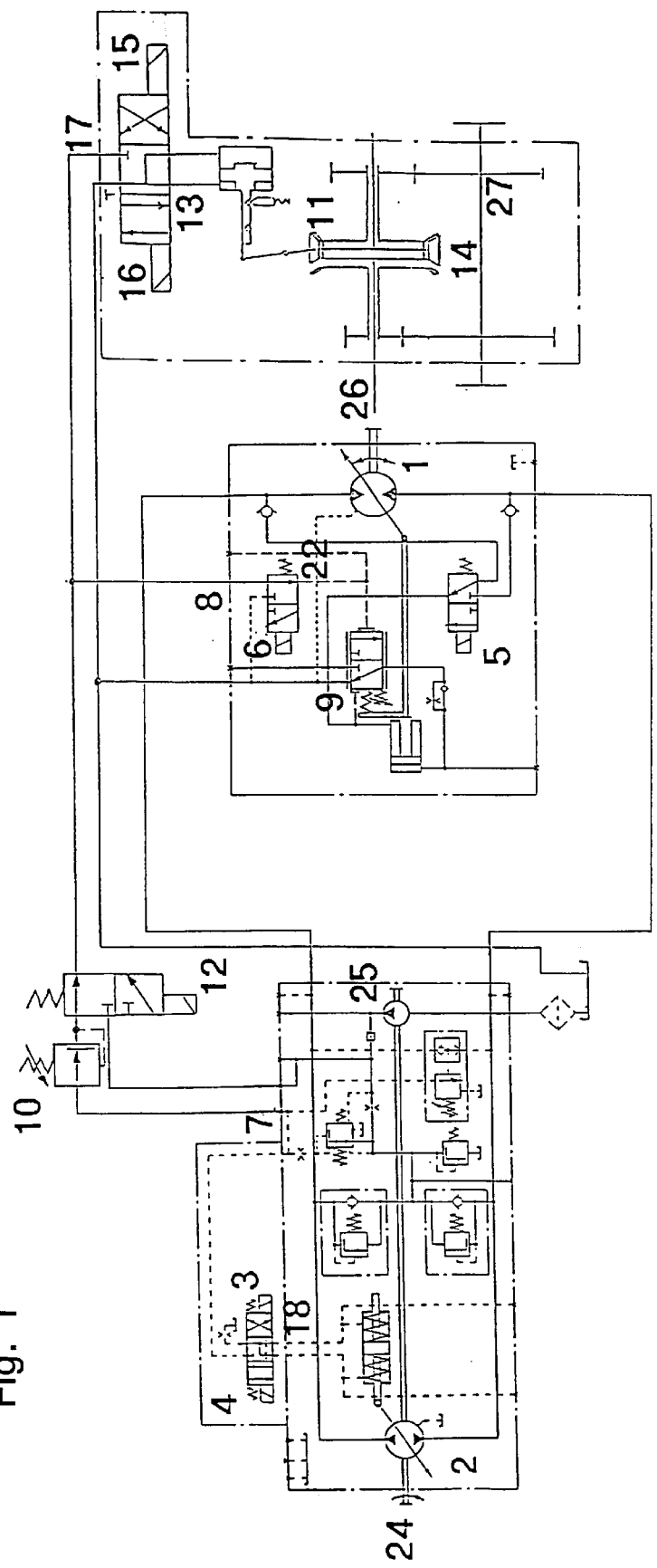
FIG. 1 is a diagrammatic representation of a traveling mechanism, according to the invention, for a closed hydrostatic circuit such as that of a loader.

FIG. 1 describes a shift diagram in a closed hydrostatic circuit, such as that of a loader, in which either full speed or full shoveling force is needed. The travel direction is shifted by means of the magnetic valve 3 or 4 on the hydrostatic variable displacement pump 2. The travel direction is coordinated on the hydrostatic variable displacement motor 1 by the magnetic valve 5 in order to prevent during the coasting operation and adjustment in direction of the maximum displacement capacity. On the hydrostatic variable displacement motor 1, a valve 6 is provided for setting the maximum displacement capacity that can be used for a creeping gear.

The hydrostatic variable displacement motor 1 is advantageously a zero lifting motor, the displacement capacity and also the torque to be transmitted resulting therefrom, can be reduced from a maximum value down to zero.

Below are described the adjustment operations during travel of hydrostatic variable displacement pump 2 and hydrostatic variable displacement motor 1. The hydrostatic variable displacement pump 2 oscillates according to the input rotational speed of the driving motor 24. By virtue of the resulting recoil forces of the hydrostatic variable displacement pump 2, the power-dependent high pressure acts refractively, i.e. the rotational speed of the hydrostatic variable displacement motor 1 decreases. The control pressure proportional to the rotational speed outcrops on the control pressure connection 7 of the hydrostatic variable displacement pump 2 and on the control-pressure connection 8 of the hydrostatic variable displacement motor 1. The hydrostatic variable displacement motor 1 oscillates, depending the pressure, from maximum to lesser displacement capacity. In normal travel operation, i.e. in the first or second gear, the maximum rotational speed of the hydrostatic variable displacement motor 1 must be limited. Since this is not possible by setting a mechanical stop for fixing the minimal displacement capacity, the minimal displacement capacity must be hydraulically-mechanically set by producing a balance between control pressure and the force produced by the feedback spring 9. The pressure and the minimum displacement capacity are limited by a control pressure-reducing valve 10. To the control-pressure dependent adjustment of the displacement capacity of the hydrostatic variable displacement motor 1 from minimum to maximum stands opposed a high-pressure dependent adjustment of the displacement capacity of the hydrostatic variable displacement motor 1 from minimum to maximum.

When traveling, the possible change of gear from first to second and vice versa occurs only in the automatic operation and is effected depending on the output rotational speed of the gear mechanism 11. During change of gears, the magnetic valve 12 is first shifted which causes a supply pressure higher than the maximum pressure of the pressure-reducing valve 10 to crop out on the control-pressure connection 8 of the hydrostatic variable displacement motor 1. The supply pressure reduces the capacity of the hydrostatic variable displacement motor 1 to zero and, simultaneously, leads to an increase of the high pressure and therewith to a reduction of the torque to zero. During this process, the fixing of the travel direction is disengaged on the hydrostatic variable displacement pump 2 by the magnetic valve 3 or 4, the effect of which is that the high pressure in the driving system is too low during the gear change. As soon as the capacity of the hydrostatic variable displacement motor 1 is at zero, the new gear is engaged in the transmission. The synchronization phase terminates as soon as the balance of input and output rotational speeds ends. The shifting time needed for this depends on the rotational speed change between input and output rotational speeds. The supply pressure always crops out during the shifting phase on the connection 17 of the 3/4 directional valve 13 of the gear mechanism 11. The synchronization unit 14 of the gear mechanism 11 automatically adapts the rotational speed of the hydrostatic variable displacement motor 1 according to the shift mode (from first to second gear or vice versa) and the ratio range of the output rotational speed. The synchronization unit must shift only the inert masses of the gear mechanism 11 and of the hydrostatic variable displacement motor 1 the same time as the drag torque of the hydrostatic variable displacement motor 1 staying at zero capacity.

If the hydrostatic variable displacement motor 1 is synchronized to the new ratio, the respective magnetic valves 12 and 15 and 12 and 16 are disengaged and the travel direction on the hydrostatic variable displacement pump 2 engaged by the magnetic valve 3 or 4.

The flow rate of the hydrostatic variable displacement pump 2 and the capacity of the hydrostatic variable displacement motor 1 appear according to the rotational-speed dependent high pressure. The torque of the hydrostatic variable displacement motor 1 again increases starting from zero, the gear shift is terminated.

Figure 2:
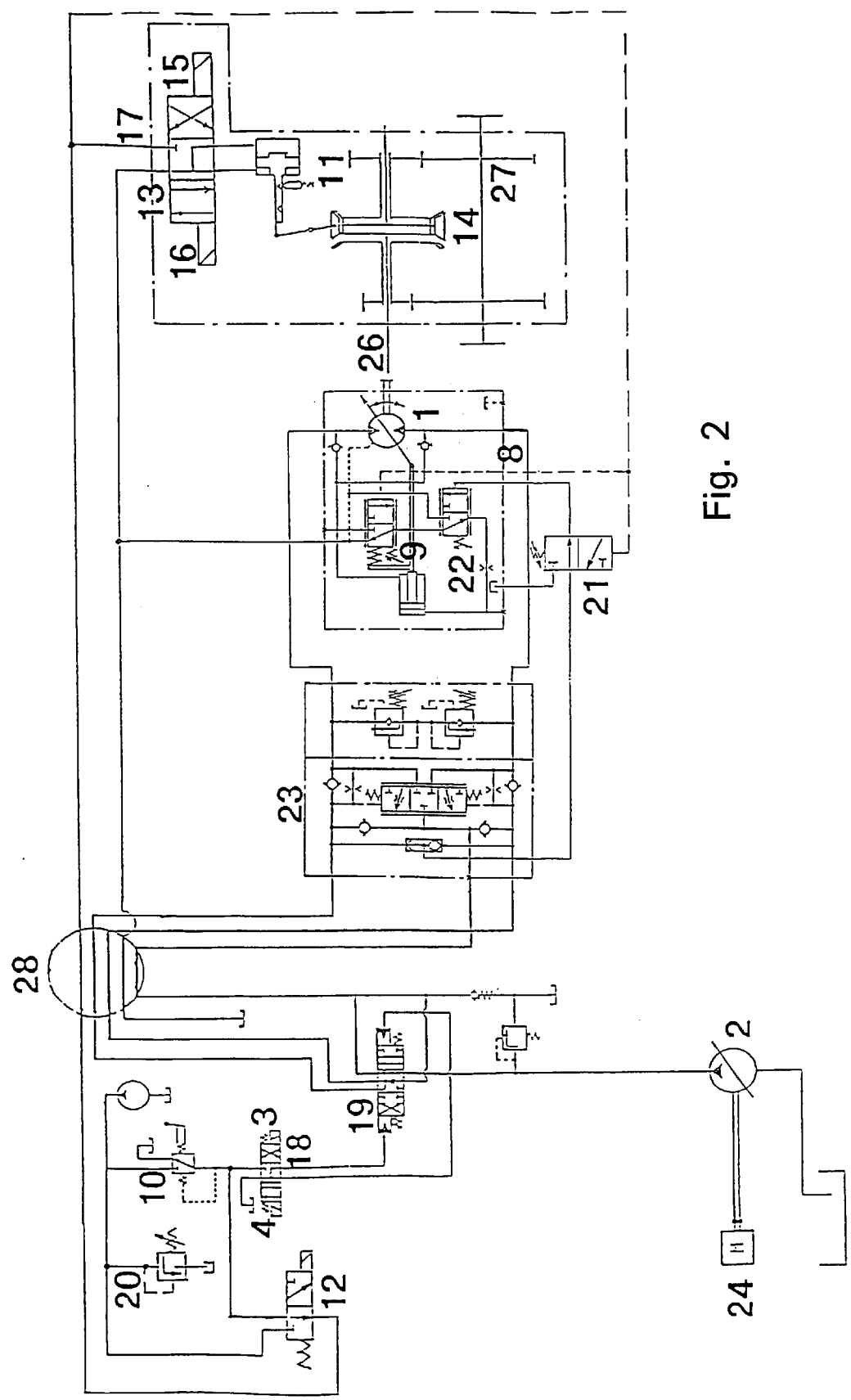
FIG. 2 is a diagrammatically shown arrangement of a traveling mechanism, according to the invention, for an open hydrostatic circuit such as that of a mobile excavator.

With the aid of FIG. 2 is described the shift sequence in an open hydrostatic circuit, such as that of a mobile excavator, in which either full speed or full shoveling force is needed.

In this case also, the travel direction is pre-selected by actuating the magnetic valve 3 or 4 on the travel-direction valve 18. First must be described the flow rate setting and the adjustment process of the hydrostatic variable displacement motor 1. The flow rate of the hydrostatic variable displacement pump 2 to the hydrostatic variable displacement motor 1 depends on two parameters, namely, the rotational speed of the motor and the precontrol pressure of the adjustable pressure-reducing valve 10 which is linked with the foot pedal of the unit user. The 6/3 directional valve 19 is controlled proportionally to the control pressure passed to the pressure-reducing valve 10 via the travel-direction valve 18 reproduced as 4/3 directional valve, i.e. is the oil current is released to the hydrostatic variable displacement motor 1 according to the opening in the 6/3 directional valve 19.

Depending on the control pressure, the hydrostatic variable displacement motor 1 oscillates from maximum to lesser capacity. The control pressure reaches the control-pressure connection 8 of the hydrostatic variable displacement motor 1 from the pressure-reducing valve 10 via the magnetic valve 12 and through the turning guide passage. In the normal travel operation, i.e. in the fist or second gear, the maximum hydromotor rotational speed must also be hydraulically-mechanically limited by setting a balance between the control pressure and the force of the feedback spring 9. The maximum control pressure and, consequently, the minimum displacement capacity are limited by a pressure-reducing valve 10.

The changes from first to second gear and vice versa, possible while traveling, occur only in the automatic operation and are carried out depending on the output rotational speed of the gear mechanism 11. When changing gear the magnetic valve 12 is first engaged which causes the outcropping on the connection 8 of the hydrostatic variable displacement motor 1 of the precontrol pressure set by the pressure-limiting valve 20 that is higher than the maximum pressure of the pressure-reducing valve 10. On the hydrostatic variable displacement motor 1 is added a hydraulically actuatable 3/2 directional valve 21 which, during the travel operation, releases supply pressure to the constant pressure regulator 22 of the hydrostatic variable displacement motor 1.

When shifting in the precontrol pressure, the 3/2 directional valve 21 changes over and thus renders ineffective the high-pressure dependent adjustment of the hydrostatic variable displacement motor 1 in direction of the maximum capacity. The hydrostatic variable displacement motor 1, as a consequence of that, adjusts the capacity to zero which, simultaneously, leads to a drop of the torque of the hydrostatic variable displacement motor 1 also to zero and to a raise in the high pressure. During the process, the driving direction of the magnetic valve 3 or 4 is switched off whereby the high pressure in the driving system, between hydrostatic variable displacement pump 2 and brake valve 23, is very low. As soon as the hydrostatic variable displacement motor 1 is at zero capacity, the new gear is engaged in the gear mechanism 11 which detects the end of the synchronization phase by comparing input and output rotational speeds. The shifting time needed for the process depends mainly on the magnitude of the transmission step. On the connection 17 of the 4/3 directional valve 13 of the gear mechanism 11 the precontrol pressure outcrops in the shifting phase. The synchronization unit 14 adapts the rotational speed of the hydrostatic variable displacement motor 1 according to the shift mode and ratio range of the output rotational speed. In this case, the synchronization unit 14 must shift only the inert masses of the gear mechanism 11 and hydrostatic variable displacement motor 1 the same as the low drag torque of the hydrostatic variable displacement motor 1 standing at zero capacity. Because of this, the synchronization unit 14 can be made of small dimensions.

If the hydrostatic variable displacement motor 1 is synchronized to the new rotational speed, the magnetic valves 12 and 15 and 12 and 16 are disengaged and the travel direction engaged on the travel-direction valve 18 by the magnetic valve 3 or 4. The flow rate of the hydrostatic variable displacement pump 2 to the hydrostatic variable displacement motor 1 then appears according to the control pressure of the pressure-reducing valve 10 and the load-dependent high pressure. The torque of the hydrostatic variable displacement motor 1 now increase again from zero on and the gear shifting is terminated.

| Reference numerals | |
|---|---|
| 1 | hydrostatic variable displacement motor |
| 2 | hydrostatic variable displacement pump |
| 3 | magnetic valve |
| 4 | magnetic valve |
| 5 | magnetic valve |
| 6 | valve to set the maximum displacement capacity |
| 7 | control-pressure connection |
| 8 | control-pressure connection |
| 9 | feedback spring |
| 10 | pressure-reducing valve |
| 11 | gear mechanism |
| 12 | magnetic valve |
| 13 | 4/3 directional valve |
| 14 | synchronization unit |
| 15 | magnetic valve |
| 16 | magnetic valve |
| 17 | pressure connection of the 4/3 directional valve |
| 18 | travel-direction valve |
| 19 | 6/3 directional valve |
| 20 | pressure-limiting valve |
| 21 | 3/2 directional valve |
| 22 | constant-pressure regulator |
| 23 | brake valve |
| 24 | driving motor |
| 25 | feed pump |
| 26 | input shaft |
| 27 | output shaft |
| 28 | turning guide passage |

What is claimed is:

1. A traveling mechanism having a driving motor (24) driving at least a hydrostatic variable displacement pump (2), the hydrostatic variable displacement pump (2) and a hydrostatic variable displacement motor (1) forming a hydrostatic circuit, the hydrostatic variable displacement motor (1) driving a gear mechanism (11), and a direction valve (18) and a pressure-reducing valve (10) being provided for regulating a hydraulic control pressure supplied to the hydrostatic variable displacement motor (1);

wherein the gear mechanism (11) is a hydrostatically driven 2-speed gear mechanism having a synchronization unit (14), the hydrostatic variable displacement motor (1) has a motor displacement capacity regulated by the hydraulic control pressure supplied to the hydrostatic variable displacement motor and an output hydraulic pressure, the hydraulic control pressure and the output hydraulic pressure are balanced by a feedback spring (9), and the hydrostatic variable displacement motor (1) has a zero lift position such that a gear shift of the gear mechanism (11) only can occur at the zero lift position when a driving torque to be transmitted by the hydrostatic variable displacement motor (1) is at a minimum value.

2. The traveling mechanism according to claim 1, wherein a flow of hydraulic pressure, between the hydrostatic variable displacement pump (2) and the hydrostatic variable displacement motor (1), is interrupted when the hydrostatic variable displacement motor (1) is in the zero lift position and the output hydraulic pressure is also zero.

3. The traveling mechanism according to claim 1, wherein the traveling mechanism is used in combination with an open hydraulic circuit.

4. The traveling mechanism according to claim 1, wherein the traveling mechanism is used in combination with a closed hydraulic circuit.

5. The traveling mechanism according to claim 1, wherein the traveling mechanism is used in combination with an open hydraulic circuit and a 3/2 directional valve (21) is utilized to engage and disengage an high pressure output for the traveling mechanism.

6. The traveling mechanism according to claim 1, wherein the synchronization unit (14) of the gear mechanism (11) is mounted to one of an input shaft (26) and an output shaft (27).

7. A traveling mechanism having a driving motor (24) driving at least a hydrostatic variable displacement pump (2), the hydrostatic variable displacement pump (2) and a hydrostatic variable displacement motor (1) forming a hydrostatic circuit, the hydrostatic variable displacement motor (1) driving a gear mechanism (11), and a direction valve (18) and a pressure-reducing valve (10) being provided for regulating a hydraulic control pressure supplied to the hydrostatic variable displacement motor (1);

wherein the gear mechanism (11) is a hydrostatically driven 2-speed gear mechanism having a synchronization unit (14), the hydrostatic variable displacement motor (1) has a motor displacement capacity regulated by the hydraulic control pressure supplied to the hydrostatic variable displacement motor and an output hydraulic pressure, the hydraulic control pressure and the output hydraulic pressure are balanced by a feedback spring (9), and the hydrostatic variable displacement motor (1) has a zero lift position such that a gear shift of the gear mechanism (11) only can occur at the zero lift position when a driving torque to be transmitted by the hydrostatic variable displacement motor (1) is at a minimum value and the motor displacement capacity is zero.

8. A traveling mechanism having a driving motor (24) driving at least a hydrostatic variable displacement pump (2), the hydrostatic variable displacement pump (2) and a hydrostatic variable displacement motor (1) forming a hydrostatic circuit, the hydrostatic variable displacement motor (1) driving a gear mechanism (11), and a direction valve (18) and a pressure-reducing valve (10) being provided for regulating a hydraulic control pressure supplied to the hydrostatic variable displacement motor (1);

wherein the gear mechanism (11) is a hydrostatically driven 2-speed gear mechanism having a synchronization unit (14), the hydrostatic variable displacement motor (1) has a motor displacement capacity regulated by the hydraulic control pressure supplied to the hydrostatic variable displacement motor and an output hydraulic pressure, the hydraulic control pressure and the output hydraulic pressure are balanced by a feedback spring (9), and the hydrostatic variable displacement motor (1) has a zero lift position such that a gear shift of the gear mechanism (11) only can occur at the zero lift position when a driving torque to be transmitted by the hydrostatic variable displacement motor (1) is at a minimum value, the motor displacement capacity is zero and a measured gear rotational speed signifies an end to a synchronization phase.

\* \* \* \* \*